US012123413B2

(12) United States Patent
Chiba et al.

(10) Patent No.: US 12,123,413 B2
(45) Date of Patent: Oct. 22, 2024

(54) SCREW COMPRESSOR HAVING A PLURALITY OF BRANCH PATHS WITH INTERSECTS AND CENTRAL AXES

(71) Applicant: Hitachi Industrial Equipment Systems Co., Ltd., Tokyo (JP)

(72) Inventors: Kotaro Chiba, Tokyo (JP); Masahiko Takano, Tokyo (JP); Shigeyuki Yorikane, Tokyo (JP); Kenji Morita, Tokyo (JP); Yoshitaka Takeuchi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 17/741,886

(22) Filed: May 11, 2022

(65) Prior Publication Data

US 2022/0268276 A1 Aug. 25, 2022

Related U.S. Application Data

(63) Continuation of application No. 16/954,847, filed as application No. PCT/JP2018/044492 on Dec. 4, 2018, now Pat. No. 11,359,626.

(30) Foreign Application Priority Data

Dec. 20, 2017 (JP) ................................ 2017-243447

(51) Int. Cl.

| | |
|---|---|
| ***F04C 2/16*** | (2006.01) |
| ***B05B 1/26*** | (2006.01) |

(Continued)

(52) U.S. Cl.

CPC .................. *F04C 2/16* (2013.01); *B05B 1/26* (2013.01); *F04C 18/16* (2013.01); (Continued)

(58) Field of Classification Search

CPC ........ F04C 2/16; F04C 18/16; F04C 15/0088; F04C 15/0092; F04C 29/02–028; F01C 1/16; F01C 21/001; F01C 21/04–045

See application file for complete search history.

(56) References Cited

U.S. PATENT DOCUMENTS

| | | | |
|---|---|---|---|
| 3,934,641 | A | 1/1976 | Chielens |
| 2004/0026528 | A1 | 2/2004 | Jenkins |

(Continued)

FOREIGN PATENT DOCUMENTS

| | | | |
|---|---|---|---|
| CN | 202900655 | U | 4/2013 |
| CN | 204961301 | U | 1/2016 |

(Continued)

OTHER PUBLICATIONS

International Search Report (PCT/ISA/210) issued in PCT Application No. PCT/JP2018/044492 dated Feb. 19, 2019 with English translation (four (4) pages).

(Continued)

*Primary Examiner* — Laert Dounis

(74) *Attorney, Agent, or Firm* — Crowell & Moring LLP

(57) ABSTRACT

Provided is a liquid supply mechanism including: a plurality of liquid supply sections each including a plurality of branch paths whose central axes intersect with each other, and a supply path having a side surface to which the plurality of branch paths of the plurality of liquid supply sections are directly connected, respectively, and supplying liquid, which is supplied from an upstream, to the branch paths.

2 Claims, 8 Drawing Sheets

(51) Int. Cl.
*F04C 18/16* (2006.01)
*F04C 29/00* (2006.01)
*F04C 29/02* (2006.01)

(52) U.S. Cl.
CPC ........ *F04C 29/0007* (2013.01); *F04C 29/028* (2013.01); *F04C 2240/30* (2013.01)

(56) References Cited

U.S. PATENT DOCUMENTS

| | | | |
|---|---|---|---|
| 2011/0014077 | A1 | 1/2011 | Martens |
| 2011/0041844 | A1 | 2/2011 | Dunne |
| 2020/0208638 | A1 | 7/2020 | Novak |

FOREIGN PATENT DOCUMENTS

| | | | |
|---|---|---|---|
| CN | 205047438 | U | 2/2016 |
| DE | 2720214 | A1 | 12/1977 |
| JP | 50-117637 | A | 9/1975 |
| JP | 51-50010 | A | 5/1976 |
| JP | 53-123613 | U | 10/1978 |
| JP | 54-154815 | A | 12/1979 |
| JP | 61-67355 | U | 5/1986 |
| JP | 2-248678 | A | 10/1990 |
| JP | 11-336683 | A | 12/1999 |
| JP | 2003-184768 | A | 7/2003 |
| JP | 2004-147564 | A | 5/2004 |
| JP | 2011-509725 | A | 3/2011 |
| JP | 2013-144295 | A | 7/2013 |
| JP | 2018-021494 | A | 2/2018 |
| JP | 2018-035782 | A | 3/2018 |
| JP | 2019-100322 | A | 6/2019 |
| WO | WO 2005/033519 | A1 | 4/2005 |
| WO | WO 2019/093109 | A1 | 5/2019 |

OTHER PUBLICATIONS

Japanese-language Written Opinion (PCT/ISA/237) issued in PCT Application No. PCT/JP 2018/044492 dated Feb. 19, 2019 (four (4) pages).

Japanese-language Office Action issued in Japanese Application No. 2017-243447 dated Jun. 9, 2020 with English translation (seven (7) pages).

Chinese-language Office Action issued in Chinese Application No. 201880077742.0 dated Dec. 30, 2020 with English translation (15 pages).

Japanese-language Office Action issued in Japanese Application No. 2020-155373 dated Aug. 31, 2021 with English translation (eight (8) pages).

SCREW COMPRESSOR HAVING A PLURALITY OF BRANCH PATHS WITH INTERSECTS AND CENTRAL AXES

CROSS REFERENCE TO RELATED APPLICATIONS

This application is a continuation of U.S. patent application Ser. No. 16/954,847, filed Jun. 17, 2020, which is a 371 of International Application No. PCT/JP2018/044492, filed Dec. 4, 2018, which claims priority to Japanese Patent Application No. 2017-243447, filed Dec. 20, 2017, the disclosures of all of which are expressly incorporated by reference herein.

TECHNICAL FIELD

The present invention relates to a liquid supply mechanism.

BACKGROUND ART

There is a liquid supply mechanism which has a function of causing jet streams of liquid to collide with each other so as to be thinned or atomized before supply.

There is a conventional technique of atomizing liquid before supply, in which a water supply section is formed in a wall surface of a casing corresponding to a compression chamber in a compressor, and water is injected from the section into the compression chamber. In the conventional technique, the water supply section includes a bottom having a blind hole at a central part, in which a plurality of small holes are formed at an angle of θ so as to communicate with the outside. The water guided to the blind hole is extensively injected through the small holes into the compression chamber. Patent Literature 1 is an example of the conventional technique.

CITATION LIST

Patent Literatures

Patent Literature 1: Japanese Patent Application Publication No. 2003-184768

SUMMARY OF THE INVENTION

Problems to be Solved by the Invention

In the screw compressor described in Patent Literature 1 using the conventional technique described above, the number of blind holes increases in proportion to the number of water supply sections (liquid supply sections). Therefore, the number of processing steps increases in proportion to the number of liquid supply sections, so that a manufacturing cost increases. Further, the number of paths increases by the number of blind holes, so that the number of joints and sealing members in the paths increases. As a result, there is an increasing risk that the liquid is leaked outside the compressor.

The present invention is intended to provide a liquid supply mechanism which allows for reducing a manufacturing cost and preventing joints and sealing members from increasing in number even in a case where a plurality of liquid supply sections are present.

Means to Solve the Problems

In order to solve the above problems, a liquid supply mechanism of the present invention includes a plurality of liquid supply sections each including a plurality of branch paths whose central axes intersect with each other, and a supply path through which liquid supplied from upstream is supplied to the branch paths. The plurality of branch paths of the plurality of liquid supply sections are directly connected to a side surface of the supply path, respectively.

Further, a screw compressor of the present invention includes the liquid supply mechanism, a screw rotor, a casing in which the screw rotor is accommodated. The liquid supply mechanism supplies liquid into a compression chamber defined in the casing.

Advantageous Effects of the Invention

According to the present invention, even in the case where the plurality of liquid supply sections are present, the manufacturing cost is reduced, and joints and sealing members are prevented from increasing in number.

EMBODIMENTS OF THE INVENTION

Figure 1:
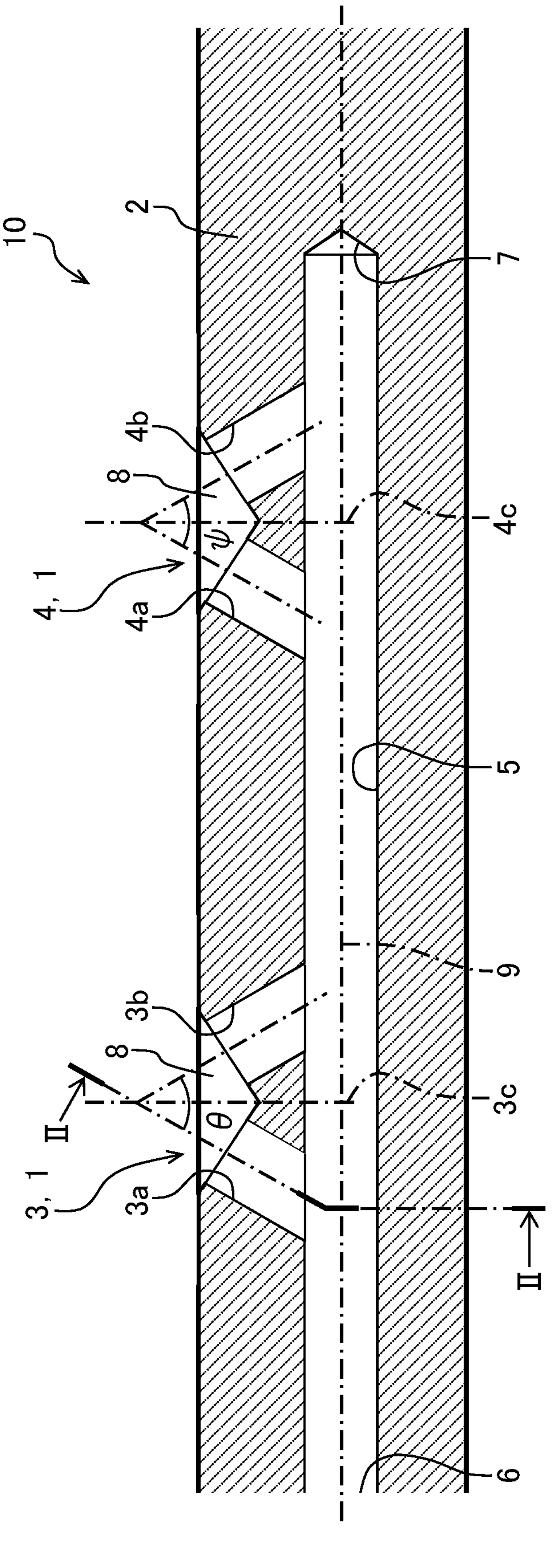
FIG. 1 is a cross-sectional view of a liquid supply mechanism according to a first embodiment of the present invention.

Descriptions will be given of embodiments of the present invention in detail with reference to the accompanying drawings as appropriate.

Note that, in the drawings, common components or similar components are denoted by the same reference numerals, and duplicate descriptions thereof are omitted appropriately.

First Embodiment

A first embodiment of the present invention will be described with reference to FIG. 1 and FIG. 2.

Figure 2:
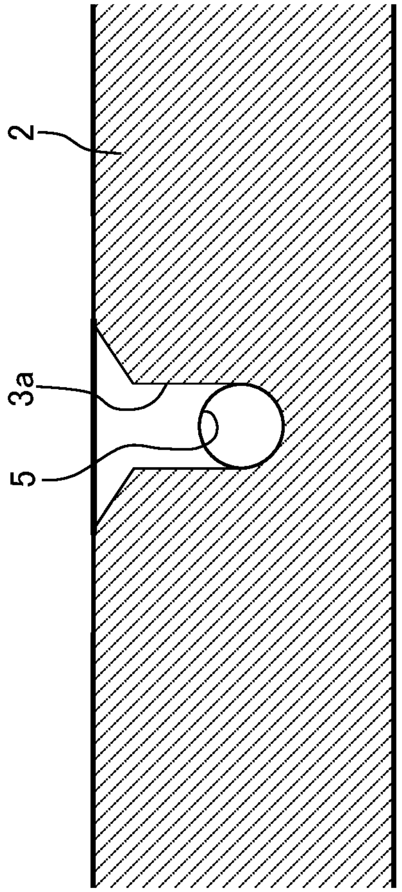
FIG. 2 is a cross-sectional view taken along a line II-II in FIG. 1.

FIG. 1 is a cross-sectional view of a liquid supply mechanism 10 according to the first embodiment of the present invention. FIG. 2 is a cross-sectional view taken along a line II-II in FIG. 1. Note that, in FIG. 2, a background is not shown.

The liquid supply mechanism 10 of the present embodiment has a function of causing jet streams of lubricant to collide with each other as liquid to be thinned or atomized before supply.

As shown in FIG. 1, the liquid supply mechanism 10 includes a plurality of liquid supply sections 1 (two in this case). The liquid supply sections 1 include a first liquid supply section 3 and a second liquid supply section 4 located downstream of the first liquid supply section 3 in a supply path 5. Thus, the liquid supply sections 1 are used as a general term of the first liquid supply section 3 and second liquid supply section 4.

The first liquid supply section 3 includes a plurality of branch paths 3*a*, 3*b*(a pair in this case) whose central axes intersect with each other at an angle of θ. The second liquid supply section 4 includes a plurality of branch paths 4*a*, 4*b* (a pair in this case) whose central axes intersect with each other at an angle of θ. The branch path 3*a* and branch path 3*b* are symmetrical with respect to a plane 3*c* running through an intersection of the central axes of the branch paths 3*a* and 3*b* and being orthogonal to a central axis 9 of the supply path 5. Further, the branch path 4*a* and branch path 4*b* are symmetrical with respect to a plane 4*c* running through an intersection of the central axes of the branch paths 4*a*, 4*b* and being orthogonal to the central axis 9 of the supply path 5. As shown in FIG. 1 and FIG. 2, the branch paths 3*a*, 3*b* and the branch paths 4*a*, 4*b* are directly connected to a side surface of the supply path 5 for communication.

As shown in FIG. 1, the supply path 5, and the branch paths 3*a*, 3*b*, 4*a*, and 4*b* are formed in a casing 2. The supply path 5 has an upstream end 6 thereof connected to a pump (not shown), and a downstream end 7 thereof forming an end surface as a dead-end surface.

With the liquid supply mechanism 10 thus configured, when the pump is activated, the lubricant flowing into the supply path 5 through the upstream end 6 flows into the branch paths 3*a*, 3*b*, 4*a*, 4*b*, respectively. The lubricant flowing out as a jet flow from the branch paths 3*a*, 3*b*, respectively, collides with each other at the angle of θ so as to be thinned and atomized to diffuse into a space 8 as a supply destination. The same applies to the lubricant flowing out from the branch paths 4*a*, 4*b*, respectively.

As described above, the liquid supply mechanism 10 according to the present embodiment includes the liquid supply sections 1, each including the branch paths 3*a* and 3*b*, or 4*a* and 4*b* having the central axes to intersect with each other, and the supply path 5 through which the lubricant supplied from upstream is supplied to the branch paths 3*a*, 3*b*, 4*a*, 4*b*. The branch paths 3*a*, 3*b*, 4*a*, 4*b* of the liquid supply sections 1 are directly connected to the side surface of the supply path 5, respectively.

Therefore, in the present embodiment, even in a case where the liquid supply sections 1 increase in number, the supply path b 5 can be used in common as a path introducing the liquid to each of the branch paths 3*a*, 3*b*, 4*a*, 4*b*, which leads to reduction in the number of processing steps and in the manufacturing cost. Further, even if the branch paths 3*a*, 3*b*, 4*a*, 4*b* increases in number, the openings to the outside do not increase in number, except communicating sections between the branch paths 3*a*, 3*b*, 4*a*, 4*b* and the space 8 as a supply destination. Therefore, the paths connecting to the openings do not increase in number, so that an increase of joints and sealing members in the paths is prevented. Accordingly, a risk of lubricant leakage to the outside is reduced in a device provided with the liquid supply mechanism 10, and the liquid supply sections 1 can be increased in number while reliability is improved.

Thus, according to the present embodiment, even in the case where the plurality of liquid supply sections 1 are present, the manufacturing cost is reduced, and the increase of joints and sealing members is prevented.

Second Embodiment

Next, a description will be given of a second embodiment with reference to FIGS. 3 and 4, focusing on differences from the first embodiment described above and the duplicate descriptions are omitted.

Figure 3:
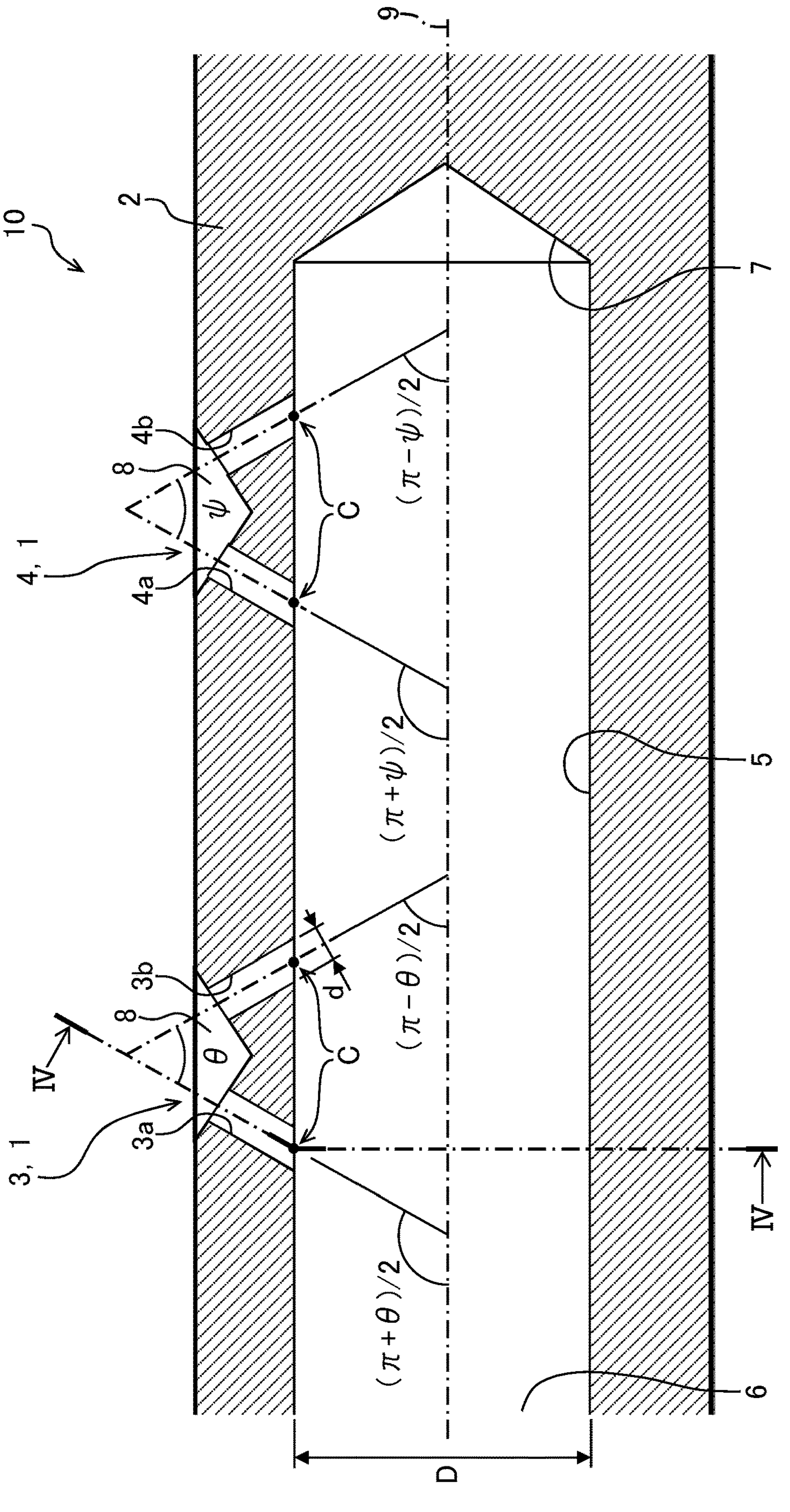
FIG. 3 is a cross-sectional view of the liquid supply mechanism according to a second embodiment of the present invention.

FIG. 3 is a cross-sectional view of the liquid supply mechanism 10 according to the second embodiment of the present invention. FIG. 4 is a cross-sectional view taken along a line IV-IV in FIG. 3. Note that in FIG. 4, a background is not shown.

Figure 4:
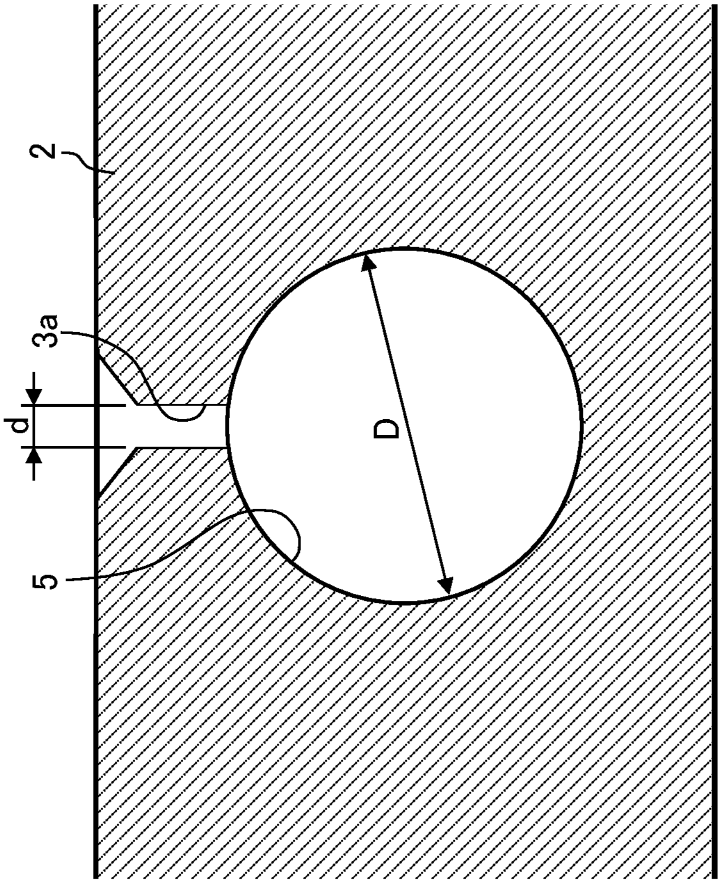
FIG. 4 is a cross-sectional view taken along a line IV-IV in FIG. 3.

As shown in FIG. 3 and FIG. 4, the inner diameter of each of the branch paths 3*a*, 3*b*, 4*a*, 4*b* is identical and denoted by d, and the inner diameter of the supply path 5 is denoted by D.

The present embodiment differs from the first embodiment in that the inner diameter D of the supply path 5 at a connecting section C between the supply path 5 and the branch paths 3*a*, 3*b*, 4*a*, 4*b* is larger than the inner diameter d of each of the branch paths 3*a*, 3*b*, 4*a*, 4*b*.

In the present embodiment, the inner diameter D of the supply path 5 and the inner diameter d of each of the branch paths 3*a*, 3*b*, 4*a*, 4*b* has a relationship shown by the following expression, for example.

$$D=6.3d \qquad (1)$$

In general, flow resistance at a branch section (connecting section), where branch pipes are branched from a main pipe, is known to be smaller when an angle, which is defined by an upstream of a main stream and the branch path, is an obtuse angle, than when the angle is an acute angle.

In the first liquid supply part 3 of the present embodiment, an angle defined by the branch path 3*a* and the central axis 9 of the supply path 5 is an obtuse angle of (π+θ)/2, and an angle defined by the branch path 3*b* and the central axis 9 of the supply path 5 is an acute angle of (π−θ)/2. Accordingly, in the first liquid supply section 3, the flow resistance at the connecting section C between the supply path 5 and the branch path 3*b* is larger than the flow resistance at the connecting section C between the supply path 5 and the branch path 3*a*. Therefore, there is a risk that a flow rate of the lubricant flowing through the branch path 3*a* is larger than that flowing through the branch path 3*b*. In this case, in the first liquid supply section 3, there is a risk that a deviation in the flow rate between the branch paths 3*a*, 3*b* gives a negative influence on uniform diffusion of the thinned or atomized lubricant, or the very characteristics of thinning and atomization.

In the present embodiment, as described above, the inner diameter D of the supply path 5 and the inner diameter d of each of the branch paths 3*a*, 3*b*, 4*a*, 4*b* are set to have the relationship shown by the expression (1). Thus, a relationship shown in the following expression is established between an average flow velocity V of the lubricant in the supply path 5 and an average flow velocity v of the lubricant in each of the branch paths 3*a*, 3*b*, 4*a*, 4*b*, based on the continuity equation of incompressible fluid (cross-sectional area×flow rate=constant).

$$v=10V \qquad (2)$$

In this case, a dynamic pressure PD in the supply path 5 and an average dynamic pressure Pd in each of the branch paths 3*a*, 3*b*, 4*a*, 4*b* is derived from the expression (2), as follows.

$$PD = (1/2) \times (\text{lubricant density}) \times V^2 \quad (3)$$

$$Pd = (1/2) \times (\text{lubricant density}) \times v^2 = (1/2) \times (\text{lubricant density}) \times 100V^2 \quad (4)$$

In the first liquid supply section 3 of the present embodiment, the total flow resistance from the upstream end 6 of the supply path 5 up to the space 8 as a supply destination is referred to as R. Further, the flow resistance in the supply path 5 is referred to as R1, the flow resistance at the connecting sections C between the supply path 5 and the branch paths 3*a*, 3*b* is referred to as R2, the flow resistance in the branch paths 3*a*, 3*b* is referred to as R3, and the flow resistance at an enlarged section from the branch paths 3*a*, 3*b* to the space 8 is referred to as R4. In this case, the total flow resistance R is obtained by: R=R1+R2+R3+R4. Here, the flow resistance R2 is defined by the average flow velocity V of the lubricant in the supply path 5. Further, the flow resistance R4 is defined by the average flow velocity v of the lubricant in the branch paths 3*a*, 3*b*.

The flow resistance is proportional to the dynamic pressure. Therefore, a ratio of the flow resistance R2, at the connecting sections C between the supply path 5 and the branch paths 3*a*, 3*b*, to the total flow resistance R is about 1%, based on the expressions (3) and (4). Consequently, the flow resistance R3 in the branch path 3*a*, 3*b* is overwhelmingly dominant in the total flow resistance R. Accordingly, influence of the flow resistance at the connecting sections C due to the angles defined by the supply path 5 and each branch path 3*a*, 3*b*, on the flow rate of the lubricant through each branch path 3*a*, 3*b*, is extremely small. This allows for reducing deviation of the flow rate of the lubricant in each branch path 3*a*, 3*b*. The same advantageous effect is obtained in the second liquid supply section 4.

Therefore, according to the second embodiment, a diffusion range of the lubricant after jet collision is unified, and deterioration of characteristics of thinning and atomization is prevented, in addition to the advantageous effect obtained by the first embodiment described above.

Third Embodiment

Next, a description will be given of a third embodiment of the present invention with reference to FIG. 5, focusing on differences from the first embodiment described above, and the duplicate descriptions are omitted.

Figure 5:
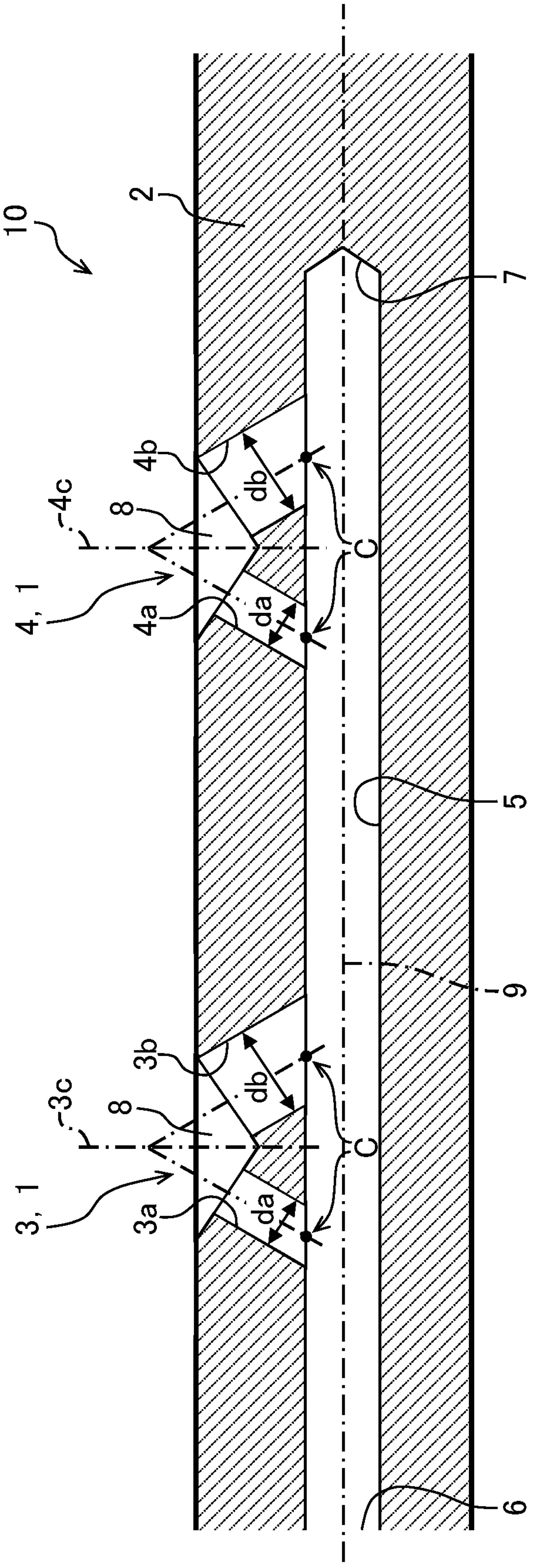
FIG. 5 is a cross-sectional view of the liquid supply mechanism according to a third embodiment of the present invention.

FIG. 5 is a cross-sectional view of the liquid supply mechanism 10 according to a third embodiment of the present invention.

As shown in FIG. 5, an inner diameter of each of the branch path 3*a* and branch path 4*a* is referred to as da, and an inner diameter of the branch path 3*b* and branch path 4*b* is referred to as db. Further, a plane, which runs through the intersection of the central axes of the branch paths 3*a*, 3*b* and is orthogonal to the central axis 9 of the supply path 5, is referred to as 3*c*, and a plane, which runs through the intersection of the central axes of the branch paths 4*a*, 4*b* and is orthogonal to the central axis 9 of the supply path 5, is referred to as 4*c*.

The present embodiment differs from the first embodiment in that the inner diameter db of the branch path 3*b* located downstream of the supply path 5 with respect to the plane 3*c* is larger than the inner diameter da of the branch path 3*a* located upstream of the supply path 5 with respect to the plane 3*c*. The same applies to the branch paths 4*a*, 4*b*. That is, in each of the liquid supply sections 1, the branch path 3*b* or 4*b*, which is located downstream, has a larger inner diameter.

That is, the inner diameter da of the branch path 3*a* and branch path 4*a* and the inner diameter db of the branch path 3*b* and branch path 4*b* have a relationship shown by the following expression.

$$db > da \quad (5)$$

As described in the second embodiment, the flow resistance at the connecting section C between the supply path 5 and the branch path 3*a* is smaller than the flow resistance at the connecting section C between the supply path 5 and the branch path 3*b*. Therefore, the flow rate of the lubricant in the branch path 3*a* may be larger than that in the branch path 3*b*. Then, in the present embodiment, the inner diameter db of the branch path 3*b* is made larger than the inner diameter da of the branch path 3*a*, so that the flow velocity of the lubricant in the branch path 3*b* is made slower than that in the branch path 3*a*. Therefore, as described in the expression (4), the dynamic pressure in the branch path 3*b* is lower than that in the branch path 3*a*. The flow resistance in the branch paths 3*a*, 3*b* is proportional to the dynamic pressure, so that, as a result, the flow resistance in the branch path 3*b* is lower than that in the branch path 3*a*, based on the expression (5). Therefore, the difference between the flow resistance at the connecting section between the supply path 5 and the branch path 3*a* and the flow resistance at the connecting section between the supply path 5 and the branch path 3*b* is lessened. Thus, the deviation in flow rate of the lubricant in the branch paths 3*a*, 3*b* is reduced. The same advantageous effect is obtained in the second liquid supply section 4.

Therefore, according to the third embodiment, a diffusion range of the lubricant after jet collision is unified, and deterioration of characteristics of thinning and atomization is prevented, in addition to the advantageous effect obtained by the first embodiment described above.

Fourth Embodiment

Next, a description will be given of a fourth embodiment of the present invention with reference to FIG. 6, focusing on differences from the first embodiment described above, and the duplicate descriptions are omitted.

Figure 6:
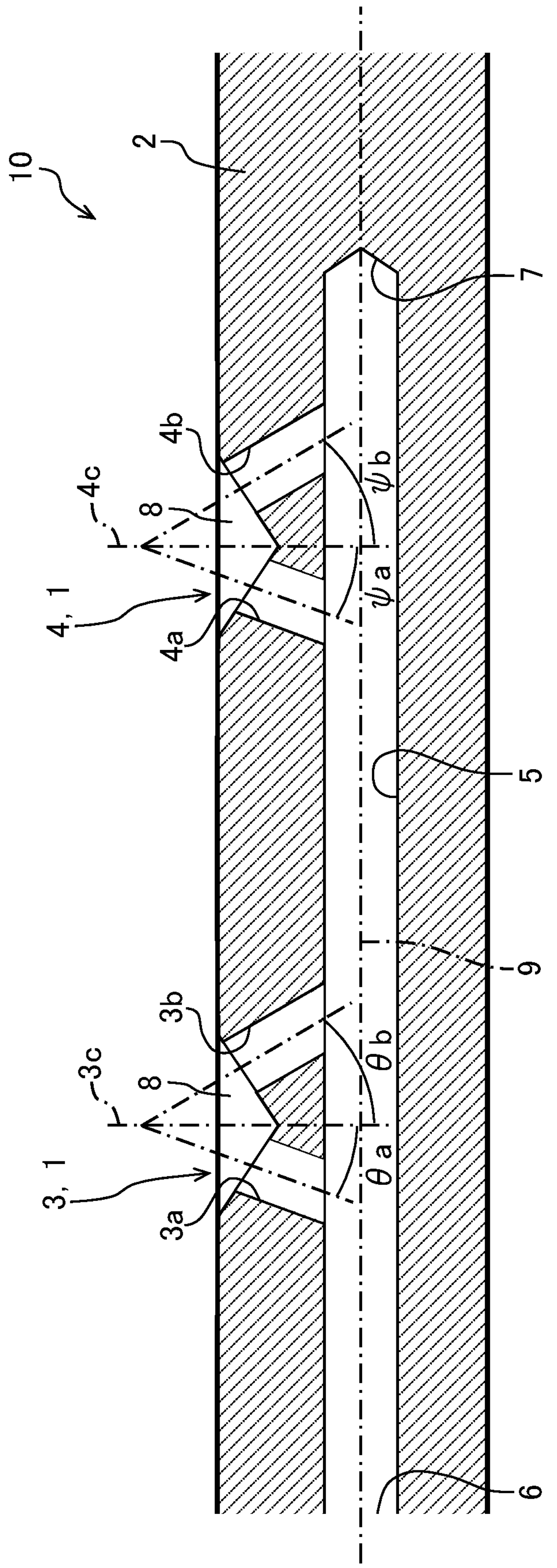
FIG. 6 is a cross-sectional view of the liquid supply mechanism according to a fourth embodiment of the present invention.

FIG. 6 is a cross-sectional view of the liquid supply mechanism 10 according to the fourth embodiment of the present invention.

As shown in FIG. 6, the plane, which runs through the intersection of the central axes of the branch paths 3*a*, 3*b* and is orthogonal to the central axis 9 of the supply path 5, is referred to as 3*c*, and the plane, which runs through the intersection of the central axes of the branch paths 4*a*, 4*b* and is orthogonal to the central axis 9 of the supply path 5, is referred to as 4*c* An angle defined by the central axis of the branch path 3*a*, located upstream of the supply path 5 with respect to the plane 3*c*, and the plane 3*c*, is referred to as θa, and an angle defined by the central axis of the branch path 3*b*, located downstream of the supply path 5 with respect to the plane 3*c*, and the plane 3*c*, is referred to as θb. An angle defined by the central axis of the branch path 4*a*, located upstream of the supply path 5 with respect to the plane 4*c*, and the plane 4*c*, is referred to as Ψa, and an angle defined by the central axis of the branch path 4*b*, located downstream of the supply path 5 with respect to the plane 4*c*, and the plane 4*c*, is referred to as Ψb. The angles θa, θb, Ψa, Ψb each are a crossing angle defined on a side of a branch path closer to the supply path 5 and an acute angle.

The present embodiment differs from the first embodiment in that the angle θb is larger than the angle θa, and the angle Ψb is larger than the angle Ψa. That is, in each of the liquid supply sections 1, the branch path 3*b* or 4*b* located downstream has a larger angle defined by the central axis and the plane 3*c* or 4*c*.

That is, the angles θa, θb, Ψa, Ψb have relationships shown in the following expressions.

$$\theta a<\theta b \quad (6)$$

$$\Psi a<\Psi b \quad (7)$$

As described in the second embodiment, the flow resistance at the connecting section C between the supply path 5 and the branch path 3*a* is smaller than that at the connecting section C between the supply path 5 and the branch path 3*b*. Therefore, the flow rate of the lubricant in the branch path 3*a* may be larger than that in the branch path 3*b*. The lubricant injected from the branch path 3*a* and branch path 3*b* collides with each other, and normally diffuses to be thin on the plane 3*c*. An oil film spreads in the width direction with progression, to become gradually thinner and then is broken into pieces and atomized. However, in a case where the flow rate of the lubricant in the branch path 3*a* is larger than that in the branch path 3*b*, the oil film formed by the collision of the jet is directed toward the branch path 3*b*. Then, in the present embodiment, the angle θb defined by the central axis of the branch path 3*b* and the plane 3*c* is made larger than the angle θa defined by the central axis of the branch path 3*a* and the plane 3*c*, to reduce the oil film from directing toward the branch path 3*b*. This reduces influence due to deviation of the flow rate of the lubricant in the branch paths 3*a*, 3*b*. The same advantageous effect is obtained in the second liquid supply section 4.

Therefore, according to the fourth embodiment, a diffusion range of the lubricant after jet collision is unified, and deterioration of characteristics of thinning and atomization is prevented, in addition to the advantageous effects obtained by the first embodiment described above.

Next, a description will be given of a screw compressor 100 provided with the liquid supply mechanism 10 of the embodiments described above, with reference to FIG. 7 and FIG. 8.

Figure 7:
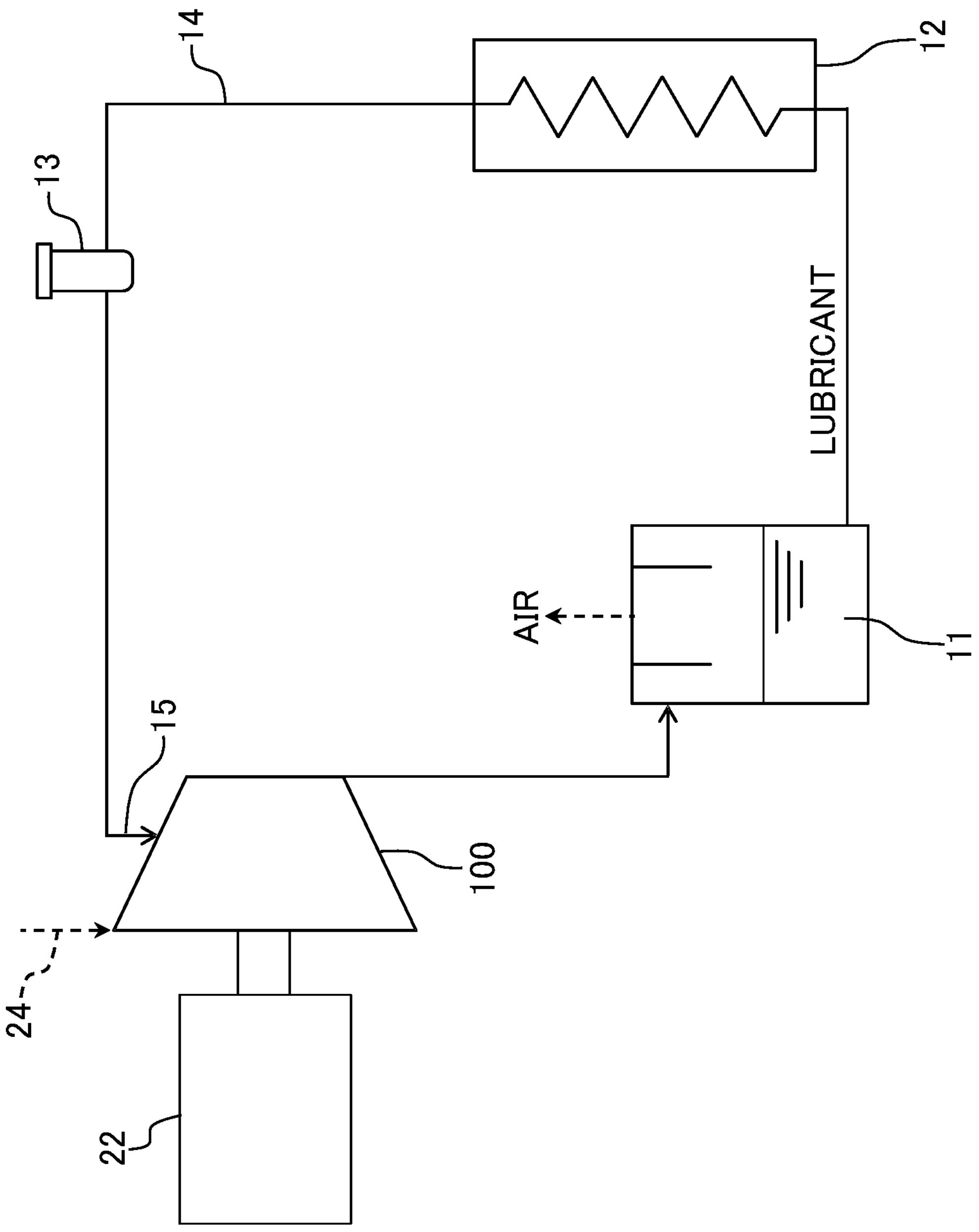
FIG. 7 is a schematic diagram showing a supply flow path of lubricant supplied to the liquid supply mechanism provided in a screw compressor.
Figure 8:
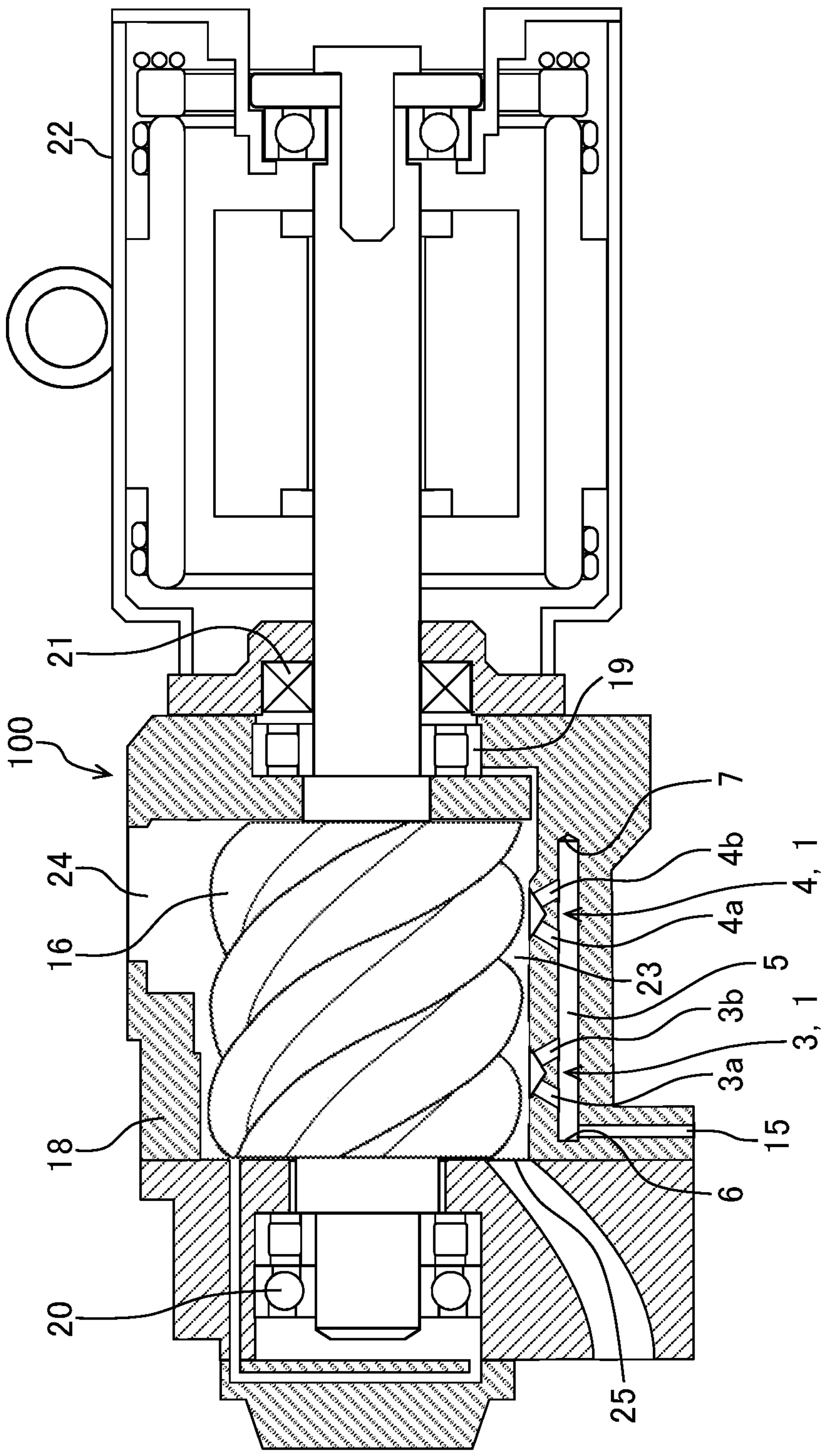
FIG. 8 shows a configuration of the screw compressor in FIG. 7.

The screw compressor 100 shown in FIG. 7 and FIG. 8 is a so-called oil-feeding air compressor. The configuration of the liquid supply mechanism 10 provided in the screw compressor 100 has the same as that shown in FIG. 1, denoted by the same reference numerals, and the duplicate descriptions are omitted. Note that the screw compressor 100 may be configured to include the liquid supply mechanism 10 shown in FIG. 3, FIG. 5 or FIG. 6.

FIG. 7 is a schematic diagram showing a supply flow path of the lubricant supplied to the liquid supply mechanism 10 provided in the screw compressor 100.

As shown in FIG. 7, the supply flow path of the lubricant includes the screw compressor 100, a centrifugal separator 11, a cooler 12, an auxiliary element 13 such as a filter or a check valve, and pipes 14 to connect said elements with each other. Compressed air delivered from the screw compressor 100 is mixed with the lubricant injected from the outside into the screw compressor 100. The lubricant mixed with the compressed air is separated from the compressed air by the centrifugal separator 11, is cooled by the cooler 12, and passes through the auxiliary element 13, and then is supplied again via a liquid supply hole 15 to the screw compressor 100. Note that an object to be compressed by the screw compressor 100 is not limited to air and may be other gases such as nitrogen.

FIG. 8 shows the configuration of the screw compressor 100 in FIG. 7.

As shown in FIG. 8, the screw compressor 100 includes a screw rotor 16 and a casing 18 to accommodate the screw rotor 16. The screw rotor 16 includes a male rotor and a female rotor each having helical lobes to mesh with each other from rotation.

The screw compressor 100 includes a suction bearing 19 and a delivery bearing 20 each rotatably supporting the male rotor and female rotor of the screw rotor 16, and a shaft seal member 21 such as an oil seal and a mechanical seal. The "suction" refers to a suction side, for the air, in the axial direction of the screw rotor 16, and the "delivery" refers to a delivery side, for the air, in the axial direction of the screw rotor 16.

In general, the male rotor of the screw rotor 16 has a suction end connected to a motor 22, as a rotation drive source, via a rotor shaft. The male rotor and female rotor of the screw rotor 16 are each accommodated in the casing 18 so as to keep a clearance of several tens to several hundreds μm with respect to the inner wall surface of the casing 18.

The male rotor of the screw rotor 16 driven to rotate by the motor 22 drives to rotate the female rotor, so that the volume of a compression chamber 23, defined by grooves of the male rotor and female rotor and the inner wall surface of the casing 18 surrounding the rotors, is expanded and contracted. Thus, the air is sucked through a suction port 24, is compressed to a predetermined pressure, and then is delivered through a delivery port 25.

Further, the lubricant is injected from outside the screw compressor 100 to the compression chamber 23 via the liquid supply hole 15.

One of the purposes to supply the lubricant into the compression chamber 23 is to cool the air in a compression process. In the present embodiment, in order to have a large heat transfer area between the compressed air and the lubricant to promote a cooling effect on the compressed air, a jet impingement type nozzles are provided in the two liquid supply sections 1. The first liquid supply section 3 includes the branch path 3*a* and branch path 3*b* whose central axes intersect with each other, and the second liquid supply section 4 includes the branch path 4*a* and branch path 4*b* whose central axes intersect with each other.

The branch paths 3*a*, 3*b*, 4*a*, 4*b* are all connected to the supply path 5 which communicates with the liquid supply hole 15, so that the lubricant flowing through the liquid supply hole 15 is supplied into the compression chamber 23. If paths for introducing the lubricant which flows in the supply path 5 to each branch path 3*a*, 3*b*, 4*a*, 4*b* were respectively formed in the casing 18, holes processed therefor would communicate outside the screw compressor 100, requiring sealing sections such as joints and plugs. The more the branch paths increase in number, the more the processed holes would also increase in number. Therefore, the number of processing steps would increase, and a risk of lubricant leak would increase.

In contrast, in the present embodiment, the branch paths 3*a*, 3*b*, 4*a*, 4*b* are all directly connected to the side surface of the supply path 5 for communication. Thus, no portions through which the oil supply path communicates with outside the screw compressor 100 are present other than the liquid supply hole 15. Accordingly, the number of processing steps is reduced so that the manufacturing cost is reduced, and the risk of lubricant leak to the outside the screw compressor 100 is eliminated.

Further, in the present embodiment, the pressure at the space 8 (see FIG. 1), as a supply destination, to communicate with the branch paths 3*a*, 3*b* of the first liquid supply section 3 is higher than the pressure at the space 8 (see FIG. 1), as a supply destination, to communicate with the branch paths 4*a*, 4*b* of the second liquid supply section 4. That is, in the oil supply path, the first liquid supply section 3 on the upstream is formed in a region closer to the air delivery port 25 to have higher air pressure, and the second liquid supply part 4 on the downstream is formed in a region closer to the suction port 24 to have lower air pressure. Thus, the supply path 5 communicates with the first liquid supply section 3 on the high pressure side where the pressure of the lubricant is higher in the supply path 5, so that the air in the compression chamber 23 is prevented from flowing back into the supply path 5 via the liquid supply section 3.

The present invention has been described above based on the embodiments, but the present invention is not limited thereto and includes various modifications. For example, the embodiments described above have been described in detail for the purpose of illustrating the present invention and are not necessarily limited to those including all of the configurations described above. The configurations of the embodiments may partly be added or replaced with other configurations, or deleted.

For example, in the embodiments described above, the lubricant is used as the liquid supplied by the liquid supply mechanism 10, but the liquid is not limited thereto, and other liquid such as water, coolant, fuel may be used, for example.

Further, in the embodiments described above, the liquid supply mechanism 10 includes the two liquid supply sections 1, but is not limited thereto, and the three liquid supply sections 1 or more may be formed.

Still further, in the embodiments described above, the case has been described where the pair of branch paths is formed in the every liquid supply section 1, but is not limited thereto, and three branch paths or more may be formed in the every liquid supply section 1, for example.

Yet further, in the embodiments described above, the case has been described where the liquid supply mechanism 10 is provided in the screw compressor 100, but is not limited thereto, and may be provided in another device such as a fuel injection device.

REFERENCE NUMERALS

10 liquid supply mechanism, 1 liquid supply section, 3 first liquid supply section, 3*a* branch path, 3*b* branch path, 3*c* plane, 4 second liquid supply section, 4*a* branch path, 4*b* branch path, 4*c* plane, 5 supply path, 9 central axis of supply path, 8 space as a supply destination, C connecting section, 16 screw rotor, 18 casing, 23 compression chamber, and 100 screw compressor.

The invention claimed is:

1. A screw compressor comprising:

a screw rotor, a casing configured to accommodate the screw rotor, and a liquid supply mechanism configured to supply liquid in a compression chamber defined in the casing, wherein the liquid supply mechanism includes a plurality of liquid supply sections causing jet streams of the liquid to collide with each other to be thinned or atomized so as to supply to the compression chamber; and a supply path configured to supply the liquid supplied from an upstream to the plurality of liquid supply sections, the plurality of liquid supply sections are directly connected to a side surface of the supply path, the plurality of liquid supply sections includes a first liquid supply section, and a second liquid supply section located downstream of the supply path with respect to the first liquid supply section, the first liquid supply section communicates with a first region of the compression chamber, the second liquid supply section communicates with a second region of the compression chamber, and a gas pressure in the first region is higher than a gas pressure in the second region, wherein the supply path communicates with the first liquid supply section on a high pressure side where the pressure of the liquid is higher in the supply path, so that air in the compression chamber is prevented from flowing back into the supply path via the plurality of liquid supply sections.

2. A screw compressor comprising:

a screw rotor, a casing configured to accommodate the screw rotor, a liquid supply mechanism configured to supply liquid in a compression chamber defined in the casing, and a delivery section through which compressed gas is delivered, wherein the liquid supply mechanism includes a plurality of liquid supply sections causing jet streams of the liquid to collide with each other to be thinned or atomized so as to supply to the compression chamber; and a supply path configured to supply the liquid supplied from an upstream to the plurality of liquid supply sections, the plurality of liquid supply sections are directly connected to a side surface of the supply path, the plurality of liquid supply sections includes a first liquid supply section, and a second liquid supply section located downstream of the supply path with respect to the first liquid supply section, and the first liquid supply section is located closer to the delivery section than the second liquid supply section in an axial direction of the screw rotor, wherein the supply path communicates with the first liquid supply section on a high pressure side where the pressure of the liquid is higher in the supply path, so that air in the compression chamber is prevented from flowing back into the supply path via the plurality of liquid supply sections.

* * * * *